United States Patent [19]

Garland

[11] 3,742,137

[45] June 26, 1973

[54] CASE SHIFTING CODE GENERATOR

[75] Inventor: Stuart M. Garland, Morton Grove, Ill.

[73] Assignee: Teletype Corporation, Skokie, Ill.

[22] Filed: July 29, 1970

[21] Appl. No.: 59,217

[52] U.S. Cl.......... 178/17 C, 340/365, 340/347 DD

[51] Int. Cl............................................. H04l 15/12

[58] Field of Search...................... 340/365, 347 DD; 178/17, 17.5; 197/71, 98, 99

[56] References Cited

UNITED STATES PATENTS

| | | | |
|---|---|---|---|
| 3,526,892 | 9/1970 | Bartlett et al. | 178/17 C X |
| 3,569,991 | 3/1971 | Kerr | 178/17 C X |
| 3,441,671 | 4/1969 | Hennig | 178/17 |
| 3,623,588 | 11/1971 | Prodan | 178/17 |
| 3,530,239 | 9/1970 | Corell et al. | 340/365 X |

*Primary Examiner*—Charles D. Miller
*Attorney*—J. L. Lanis and R. P. Miller

[57] ABSTRACT

A system for case shifting the binary coded representations of the alphanumeric and figure characters of the American Standard Code for Information Interchange (ASCII) comprising three gates on each of the fifth and sixth code levels with one of the three gates of each such level energized to pass the normal code generated by an ASCII code generator in the absence of a shift command. The other two AND-gates of each of the fifth and sixth levels are energized upon the occurrence of a normal shift command. One of these other two AND-gates in each level passes a normal fifth or sixth level code signal, and the other of these two AND-gates passes an inverted fifth or sixth level signal. In the presence of a shift command in combination with a "1" state signal in the seventh level, the inverted sixth-level AND-gate and the normal fifth-level AND-gate are energized. However, a "0" state signal in the seventh level causes the normal sixth-level AND-gate and the inverted fifth-level AND-gate to be energized. An additional AND-gate monitors the sixth and seventh levels and an auxiliary shift contact. Upon concurrence of "1" state signals in both the sixth and seventh levels and the closure of the auxiliary shift contact, the additional AND-gate delivers a shift signal to the normal shift apparatus of the circuit in order to case shift only the alphabetic characters.

1 Claim, 2 Drawing Figures

FIG. I

INVENTOR
STUART M. GARLAND

BY William G. Dossé
ATTORNEY

| Bits | | | | | | | | | | | | |
|---|---|---|---|---|---|---|---|---|---|---|---|---|
| $b_7$ → | | | | | 0 | 0 | 0 | 0 | 1 | 1 | 1 | 1 |
| $b_6$ → | | | | | 0 | 0 | 1 | 1 | 0 | 0 | 1 | 1 |
| $b_5$ → | | | | | 0 | 1 | 0 | 1 | 0 | 1 | 0 | 1 |
| $b_4$ | $b_3$ | $b_2$ | $b_1$ | COLM. → / ↓ ROW | 0 | 1 | 2 | 3 | 4 | 5 | 6 | 7 |
| 0 | 0 | 0 | 0 | 0 | NUL | DLE | SP | 0 | @ | P | ` | p |
| 0 | 0 | 0 | 1 | 1 | SOH | DC1 | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENQ | NAK | % | 5 | E | U | e | u |
| 0 | 1 | 1 | 0 | 6 | ACK | SYN | & | 6 | F | V | f | v |
| 0 | 1 | 1 | 1 | 7 | BEL | ETB | ' | 7 | G | W | g | w |
| 1 | 0 | 0 | 0 | 8 | BS | CAN | ( | 8 | H | X | h | x |
| 1 | 0 | 0 | 1 | 9 | HT | EM | ) | 9 | I | Y | i | y |
| 1 | 0 | 1 | 0 | 10 | LF | SUB | * | : | J | Z | j | z |
| 1 | 0 | 1 | 1 | 11 | VT | ESC | + | ; | K | [ | k | { |
| 1 | 1 | 0 | 0 | 12 | FF | FS | , | < | L | \ | l | ¦ |
| 1 | 1 | 0 | 1 | 13 | CR | GS | – | = | M | ] | m | } |
| 1 | 1 | 1 | 0 | 14 | SO | RS | . | > | N | ∧ | n | ~ |
| 1 | 1 | 1 | 1 | 15 | SI | US | / | ? | O | — | o | DEL |

FIG. 2

CASE SHIFTING CODE GENERATOR

FIELD OF THE INVENTION

This invention relates to code generators and more particularly to a case shifting device for a binary code generator.

BACKGROUND OF THE INVENTION

It is known in the prior art of binary coded case shifting devices selectively to invert the fifth or sixth level of the seven-level American Standard Code for Information Interchange (ASCII) (eight-level with parity) in response to the state of the seventh level code bit and the closure of a shift energizing contact. The term "level" indicates the relative dimension (in time or space) reserved for each bit in a code combination. The term "level" can also refer to the bits so appearing or to associated portions of an apparatus for generating or using the bits. Closure of this shift contact normally causes the inversion of the sixth level bit if the seventh level bit is marking ("1" state) and causes the inversion of the fifth level bit if the seventh level bit is spacing ("0" state). Under such circumstances the seventh level is in the "1" state when an alphabetic character key is depressed on a code generating keyboard. This is normally shifted from a lower case to an upper case alphabetic character by inverting the sixth level bit. However, when a numeric key is depressed, the seventh level bit is in the "0" state and the fifth level is inverted in order to generate the non-numeric figures (symbols) normally associated with upper case numerics on a conventional office typewriter.

For computer programming, a considerable amount of shifting is required; because, most computer programming techniques now involve extensive use of numeric and upper case alphabetic characters.

Therefore, it is an object of the present invention selectively and automatically to shift alphabetic-representing codes to the upper case version of the code generating key depressed and to refrain from shifting upon the depression of a numeric key.

It is another object of the present invention to operate a shift function in response to the monitoring of generated code signals.

SUMMARY OF THE INVENTION

In accordance with the present invention a selective case shift is achieved by a manual input setting in conjunction with the generation of a predetermined class of code combinations.

BRIEF DESCRIPTION OF THE DRAWING

A more thorough understanding of the present invention may be had by referring to the following detailed description when considered in conjunction with the accompanying drawings wherein:

FIG. 1 is a schematic diagram of a case shifting circuit for use with the American Standard Code for Information Interchange (ASCII) and FIG. 2 is a chart illustrating the American Standard Code for Information Interchange.

DETAILED DESCRIPTION

Figure 1:
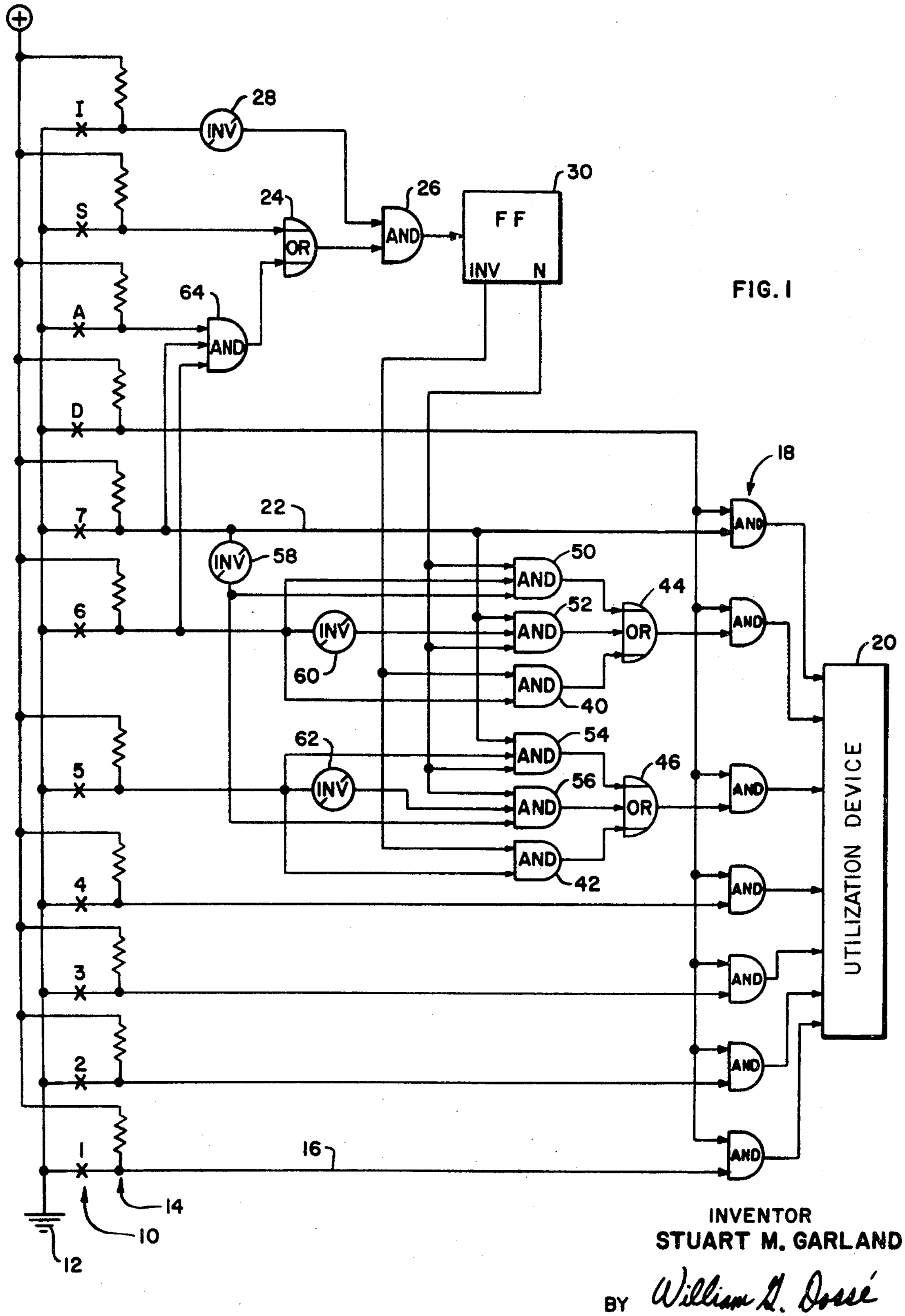

Referring now to the drawings and more specifically to FIG. 1, there are shown a plurality of keyboard-operated, code-generating contacts 10. While any one of these keyboard contacts 10 will be referred to generally by the reference number 10, in referring to any individual keyboard contact, that contact will be referred to with a dash number. The dash number will be a digit from one to seven, inclusive, or one of the letters A, S, or I. The contacts 10 are the individual code-generating contacts that may or may not be closed when a key on the keyboard of a teleprinter transmitter is depressed, depending on which key is depressed. A data-available contact referred to by the dash-letter D is closed upon each key depression. The contacts A and S are closed only by depressing the shift and auxiliary shift keys. The contact I is closed whenever shift is to be inhibited. The contacts 10 all have one of their contact elements connected to ground potential 12 which is merely an electrical common terminal which, for convenience, is referred to with the conventional symbol for an electrical ground. The other contact element of each of the contacts 10 is connected by an individual resistor 14 — which may also be referred to by appropriate dash numbers in order to refer to an individual resistor of the many resistors 14. The other end of each resistor 14 is connected to the positive terminal of a battery. The negative terminal of the battery is assumed to be connected to the ground potential 12. Depressing a key on the keyboard of the above-mentioned teleprinter closes selective ones of the contacts 10-1 to 10-7 and 10-I in accordance with the ASCII code representation of the character associated with the key depressed. A vertical parity bit may be generated by any known technique including a plurality of exclusive OR-gates (not shown).

LOWER CASE

Assume, for purpose of illustration, that the code contact 10-1 is closed, electrical current is drawn from the positive battery through the resistor 14-1 and the closed contact 10-1 to the ground or common potential 12, thereby maintaining a code wire 16 at ground potential. The code wire 16 is connected to one of a plurality of output AND-gates 18. There are eight output AND-gates 18, each of which is associated with one of the seven code levels of the ASCII code. The code lead 16 is connected to one of the two input terminals of the AND-gate 18-1 (dash numbers are also used to designate individual ones of the output AND-gates 18).

A short time after the code contact 10-1 is closed, the data-available contact 10-D is closed. This applies ground potential to the other input terminal of the output AND-gate 18-1 as well as to one of the input terminals of all of the other output AND-gate 18. The AND-gates 18 are arranged to generate a zero-volt or ground potential output in response to a zero-volt input at both of their input terminals. Therefore, so long as the contacts 10-1 and 10-D remain closed, the AND-gate 18-1 generates a zero-volt signal to a telegraph transmitter or utilization device 20. The code levels numbered two, three, and four are substantially the same as the number one code level. The number seven level is very similar to the number one code level except that there are several points at which signals are taken from a code wire 22 carrying the number seven level signal, in order to perform other logic functions.

NORMAL UPPER CASE SHIFT

As pointed out above, the number five and number six levels of the ASCII code must be selectively inverted when the shift key on the associated keyboard is depressed. Whether the number five level or the number six level is inverted is dependent upon the nature of the bit generated for the number seven level code signal (whether it is a "1" state or a "0" state signal).

Depressing the normal shift key on the associated keyboard closes the contact 10-S which sends a zero-volt signal through an OR-gate 24 and to one of the inputs of an AND-gate 26. The other input to the AND-gate 26 is provided by an inverter 28 which normally provides a zero-volt signal to the AND-gate 26. Therefore, depression of the shift key of the associated keyboard closes the contact 10-S and deiivers a zero-volt signal to a shift flip-flop 30.

The shift flip-flop 30 is a DC flip-flop and remains in its "1" state as long as it receives a zero-volt signal from the AND-gate 26 but reverts to the "0" state as soon as the zero-volt signal from the AND-gate 26 is removed.

In the unshifted condition of the associated keyboard, the normal shift contact 10-S is open. Therefore, the shift flip-flop 30 normally remains in the "0" state and provides a "1" state (zero-volt) signal at its inverted output 32 and a "0" state (positive-voltage) signal at its normal output 34.

When the operator depresses the normal shift key, the shift contact 10-S is closed, and the shift flip-flop 30 then maintains a "0" state signal on the inverted output 32 and a "1" state signal on the normal output 34.

The inverted output 32 is connected to a pair of normal AND-gates 40 and 42. As long as the shift flip-flop 30 is in its unshifted condition, it delivers a "1" state (zero-volt) signal to one of the inputs of each of the AND-gates 40 and 42. The other input of the AND-gate 40 is connected diretly to the code generating contact 10-6. Therefore, as long as a "1" state signal is applied to the AND-gate 40 by the shift flip-flop 30, a normal code from the code contact 10-6 is sent through an OR-gate 44 to the output AND-gate 18-6.

Similarly, whenever the shift flip-flop 30 is in its unshifted condition, the condition of the number five level contact 10-5 is sent directly through the AND-gate 42 and an OR-gate 46 to the output AND-gate 18-5. Consequently as long as the shift flip-flop 30 remains in its unshifted condition, the utilization device 20 received code signals exactly as these code signals are generated by the selective closures of the code generating contacts 10-1 to 10-7.

In order normally to shift or place the keyboard in the shifted condition, the keyboard shift key is depressed, which causes the shift contact 10-S to be closed and change the shift flip-flop 30 from the unshifted condition to the shifted condition. In the shifted condition, the shift flip-flop 30 sends a "0" state signal to the AND-gates 40 and 42, thereby disabling them. The shift flip-flop 30 also sends a "1" state signal through the normal output 34 to four shift AND-gates 50, 52, 54, and 56, thereby attempting to send information or to pass information from the code contacts 10-5 and 10-6 through these four shifted AND-gates. If the number seven level generates a "1" state signal (zero-volt), only the shift AND-gates 52 and 54 are energized. If the number seven level generates a "0" state signal (positive voltage), an inverter 58 sends a "1" stage signal to the shift AND-gates 50 and 56, causing them to be energized.

Referring now to FIG. 2, if, in the shifted condition, the number seven bit is a "0" state signal, a non-alphabetic key was depressed — most probably a number key. A non-numeric figure — which is the usual upper-case representation of the number key depressed — must now be represented by the code generated. To do this, the number five code level bit should be inverted in order to indicate the shift from the numeric class of characters to the non-numeric, figures class of characters. The number six code level bit should not be shifted or inverted but should remain the same. A pair of code inverters 60 and 62 are provided in order to generate an inverted representation of the code signals of the number fve and number six code levels respectively. These inverted codes are delivered to the shift AND-gates 52 and 56 respectively.

If the number seven level is in the "0" state (non-alphabetic key depressed), the shift AND-gate 52 and 54 are disabled, thereby preventing the inverted representation of the number six level signal from being delivered to the OR-gate 44 and preventing the normal number five level signal from passing through the AND-gate 54 to the OR-gate 46. However, since the number seven level carries a "0" state signal, the inverter 58 generates a "1" state signal which enables the shift AND-gates 50 and 56, thereby permitting the normal number six code level signal to reach the OR-gate 44 and permitting the inverted number five code level signal to reach the OR-gate 46. Therefore, in the presence of a closure of the shift contact 10-S and a spacing number seven code level bit (contact 10-7 open), a normal number six level signal will be delivered to the utilization device 20 and an inverted number five level signal will be delivered to the utilization device 20, in accordance with the requirement of the ASCII code shown in FIG. 2.

If the number seven level signal is marking ("1" state), the AND-gates 52 and 54 are energized; and the AND-gates 50 and 56 are not energized. Therefore, with a marking seventh level signal, an inverted number six code level signal is delivered through the OR-gate 44 to the utilization device 20; and a normal number five level signal is delivered through the OR-gate 46 to the utilization device 20. A marking number seven level signal is associated with an alphabetic character in the ASCII chart of FIG. 2; and in order to shift from the lower case aliphabetic character to the upper case alphabetic character, the number six code level bit is inverted and the number five code level bit is not inverted.

SHIFT INHIBIT

Certain of the specific class of codes in the ASCII should not be shifted in spite of the depression of the shift key and the closure of the shift contact 10-S. Depression of such a non-shifting key on the code generating keyboard causes the closure of an inhibiting contact 10-I. Closure of the contact 10-I causes the inverter 28 to issue a "0" state signal to the AND-gate 26, thereby removing any shift energization which might have been present in the shift flip-flop 30. Therefore, if the shift flip-flop 30 is in the shifted condition, closure of the inhibiting contact 10-I causes the shift flip-flop 30 to revert to the unshifted condition so long as the inhibit contact 10-I remains closed. If the shift flip-flop 30 is in the unshifted condition, closure of the inhibit contact 10-I has no effect.

AUXILIARY SHIFT

One of the most common uses for modern teleprinter keyboards and devices is as an input to a digital computer. In using such a keyboard as a digital computer input, the principal class of characters used are the upper-case letters and the numbers, rather than the non-numeric class of figures. Therefore, in typing a computer program or significant quantities of computer input data, considerable shifting is necessary to obtain upper-case alphabetic and numeric (lower case) classes of characters.

This can be accomplished automatically according to the present invention with a single, auxiliary locking shift key on the keyboard, depression of which closes the auxiliary contact 10-A shown in FIG. 1. Closure of the auxiliary shift contact 10-A sends a "1" state signal to an auxiliary shift AND-gate 64. The auxiliary shift AND-gate 64 has two additional inputs which are connected to the number six code level and the number seven code level code generating contacts 10-6 and 10-7.

Referring to FIG. 2, it can be seen that the depression of an alphabetic key generates a code combination wherein the number six and the number seven code levels are "1" state signals. Therefore, when a "1" state signal is generated by both the number six and the number seven code levels and when the auxiliary contact 10-A is closed, the auxiliary shift AND-gate 64 generates a "1" state signal which passes through the OR-gate 24 and is delivered to the AND-gate 26 just as though it had come from the normal shift contact 10-S.

From the foregoing, it can readily be seen that the inclusion of the auxiliary shift AND-gate 64 causes the operation of the normal shift apparatus of the circuit of FIG. 1 whenever the number six and the number seven code levels are in the "1" state. However, closure of the auxiliary shift contact 10-A will not cause the generation of shifted characters when the number seven code level is in the "0" state, which is the case upon depression of a numeric key on the code generating keyboard.

Although only one embodiment of the invention is shown in the drawing and described in the foregoing specification it will be understood that the invention is not limited to the specific embodiment shown but is capable of modification, rearrangement and substitution of parts and elements without departing from the scope of the invention.

What is claimed is:

1. An improved apparatus for generating on multiple wires multiple-level permutation binary code combination signals representing alphabetic characters, numeric figure characters, and non-numeric figure characters and having manually-controlled means for generating a case shift signal and means responsive to a shift signal for affecting a case shift operation and changing the character-representing, code combination signals from a representation of lower-case alphabetic characters and numeric figure characters to a representation of upper-case alphabetic characters and non-numeric figure characters by inverting the binary sense of the signal contained on at least one of the multiple wires, wherein the improvement comprises:

a manually-controlled, normally-open auxiliary switch for generating an auxiliary shift signal;

an AND-gate having three inputs and one output, one input connected to the auxiliary switch, the other two inputs connected to two selected ones of the multiple wires for sensing the binary signals present thereon indicative of whether the character generated is an alphabetic character or a figures character; and an OR-gate having two inputs and one output, one input connected to the means for generating a case shift signal, the other input connected to the output of the AND-gate, the output of the OR-gate connected to the means responsive to the shift signal for affecting a case shift operation.

* * * * *